(12) United States Patent
Rowe (10) Patent No.: US 7,147,230 B2
(45) Date of Patent: Dec. 12, 2006

(54) SEALING DEVICE AND SLEEVE AND HOLDING ELEMENT FOR SUCH

(75) Inventor: Michael A. Rowe, Karlstad (SE)

(73) Assignee: Kvaerner Pulping AB, Karlstad (SE)

( * ) Notice: Subject to any disclaimer, the term of this patent is extended or adjusted under 35 U.S.C. 154(b) by 454 days.

(21) Appl. No.: 10/486,615

(22) PCT Filed: Sep. 17, 2002

(86) PCT No.: PCT/SE02/01687

§ 371 (c)(1),
(2), (4) Date: Feb. 10, 2004

(87) PCT Pub. No.: WO03/041839

PCT Pub. Date: May 22, 2003

(65) Prior Publication Data

US 2004/0212153 A1    Oct. 28, 2004

(30) Foreign Application Priority Data

Sep. 19, 2001   (SE) .................................... 0103105

(51) Int. Cl.
*F16J 15/46* (2006.01)
(52) U.S. Cl. ...................... 277/583; 277/581; 277/903
(58) Field of Classification Search ........ 277/579–581, 277/583, 903; 162/331
See application file for complete search history.

(56) References Cited

U.S. PATENT DOCUMENTS

| 2,692,783 | A | * | 10/1954 | Foss ............................ 277/356 |
| 3,294,243 | A | * | 12/1966 | Cerles ......................... 210/402 |
| 3,722,895 | A | * | 3/1973 | Mevissen ..................... 277/583 |
| 3,860,271 | A | * | 1/1975 | Rodgers ....................... 285/97 |
| 4,268,331 | A | * | 5/1981 | Stevens ....................... 156/145 |
| 4,448,425 | A | * | 5/1984 | von Bergen ................. 277/545 |
| 4,537,408 | A | * | 8/1985 | Pankoke ...................... 277/345 |
| 4,821,536 | A | * | 4/1989 | Bardsley ...................... 277/387 |
| 5,511,795 | A | * | 4/1996 | Laubach et al. ............. 277/543 |
| 5,580,424 | A | * | 12/1996 | Snellman ..................... 162/371 |

(Continued)

FOREIGN PATENT DOCUMENTS

EP          1098032 A2 *  5/2001

(Continued)

*Primary Examiner*—Patricia L. Engle
*Assistant Examiner*—Gilbert Lee
(74) *Attorney, Agent, or Firm*—Rolf Fasth; Fasth Law Offices (57) ABSTRACT

The sealing device is for drum filters or filter presses to form a seal between the rotary drum end faces and the end faces of the trough in which the rotary drums are situated. A sealing element (3) is disposed in a groove (1) on the rotary drum end face, in which the sealing element (3) is pressed into contact against the opposite part by a hose element (2), preferably in form of two flexible hoses (2a, 2b), which can be pressurized internally. The hoses (2a, 2b) are disposed one on top of the other in the groove (1) beneath the sealing element (3). The two open ends of the hose element (2) are provided with sleeves (7) which enclose the ends. The sleeves (7) are held in place in the groove (1) with a holder element (10). Spaces (19a, 19b) are formed on both sides of the middle piece (12) of the holder element. One space (19a) is provided with an inlet (17) for pressurizing medium and the other space (19b) is provided with an outlet (18) for the pressurizing medium. The sealing device also has a sleeve (7) and a holder element (10).

12 Claims, 8 Drawing Sheets

U.S. PATENT DOCUMENTS

| | | | | |
|---|---|---|---|---|
| 5,746,891 A | * | 5/1998 | Withers | 162/371 |
| 5,975,532 A | * | 11/1999 | Karttunen et al. | 277/300 |
| 6,302,399 B1 | * | 10/2001 | Prinzing | 277/300 |
| 6,395,137 B1 | * | 5/2002 | Snellman | 162/371 |
| 6,402,894 B1 | * | 6/2002 | Lamas et al. | 162/323 |
| 6,551,460 B1 | * | 4/2003 | Heinzmann | 162/199 |

FOREIGN PATENT DOCUMENTS

| | | | |
|---|---|---|---|
| FR | 2523682 A1 | * | 3/1982 |
| WO | WO 9946025 A1 | * | 9/1999 |

* cited by examiner

SEALING DEVICE AND SLEEVE AND HOLDING ELEMENT FOR SUCH

PRIOR APPLICATION

This application is a U.S. national phase application based on International Application No. PCT/SE02/01687, filed 17 Sep. 2002, claiming priority from Swedish Patent Application No. 0103105-3 filed 19 Sep. 2001.

TECHNICAL FIELD

The invention relates to a sealing device, a sleeve and a holder element.

PRIOR ART

When forming a seal between rotary drum end faces and stationary end faces, there is a need to configure a contact force upon the sealing element. Various types of springs have here been applied acting against the seal. One problem has been that mechanical springs produce a force which proportionally decreases with increasing length owing to the spring characteristic $F=k \cdot X$ (where the force F is given by the spring constant k and the spring travel X). This has the effect that when the actual sealing element becomes worn, the contact force decreases, which eventually results in the sealing contact force being at its lowest when the sealing element is most worn, despite the fact that maintained sealing force will then be obtained. In Swedish application SE 0100260-9, a sealing device is shown, which comprises a sealing element arranged in a circularly drawn groove on a circular end faced housing in which the seal is formed by the sealing element being pressed into contact against the rotary drum end face through pressurization of a hose element in the bottom of the groove for the purpose of allowing a continually high spring force exertion against the sealing element, regardless of the degree of wear of the latter. SE0100260-9does not however state in closer detail how the connection of the pressurizing medium is to be made.

By virtue of EP348164, a seal for a drum wash for cellulose pulp is shown. Here, however, the seal sits only on a small part of the circumference and only one tubular hose is used. In FR2523682 a seal with double hoses is shown, in which pressurization of the hose is effected through holes in the walls of the hose. This design is not made to be able to work between two surfaces in which relative sliding is [configured]. In U.S. Pat. No. 4,448,425, a pressurized strip for axial sealing is shown, in which it too is pressurized via holes in the wall of the strip.

The abovementioned solutions do not produce a satisfactory locking of interacting sealing elements and/or pressurization is effected via a hole in the wall of the seal. The prior art has not exhibited solutions which offer simple pressurization of expanding force elements which can configure a force application over essentially the whole of the circumference.

BRIEF DESCRIPTION OF THE INVENTION

The purpose of the invention is to offer a device which effectively allows a guaranteed pressurization and fixing of the hose element and hence an adjustable and suitable contact force upon the sealing element. The invention is preferably used in rotary drum filters or rotary drum filter presses, preferably wash presses for cellulose pulp, in which the groove, the hose element and the sealing element have the shape of a circle situated in the periphery of the drum end faces.

Another purpose is to offer a sealing device which gives a force application against the sealing element over essentially the whole of its circumference, including in the section for the pressurization of the hose element.

A further object is to offer a sealing device of simple design, in which individual elements can easily be replaced at low cost. The fact that the sealing device according to the invention consists of a plurality of interacting parts enables these to be individually replaced. For example, the sealing element and the hose element with their sleeves can be changed without the holder element simultaneously needing to be replaced, since the pressure connection is effected via a pressurized cavity. To enable the parts of the sealing device to be changed rapidly, the groove can expediently be constituted by a groove element which can be removed from the end face. Once the end face in which the sealing device is disposed has been opened somewhat out of the contact position, the groove element can be displaced from the centre of rotation so that parts of the sealing device thereby become accessible outside the periphery of the end face. By rotation of the groove element, the parts in the sealing device can easily be changed without the whole of the end face needing to be removed.

These objects are achieved with the distinguishing features specified in the characterizing parts to Patent claims 1, 5 and 11. Further characteristics and aspects and advantages of the invention can be seen from the subsequent patent claims and from the following detailed description of an embodiment.

DETAILED DESCRIPTION OF THE INVENTION

Figure 1A:
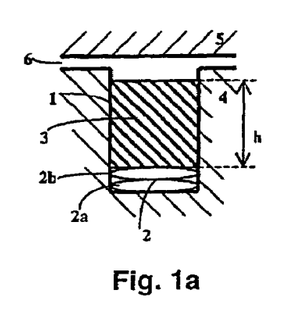
FIG. 1a, b, c show in diagrammatic representation the structure of a working method of a sealing device on which the devices according to the invention are used.
Figure 1B:
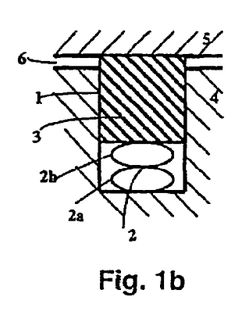
Figure 1C:
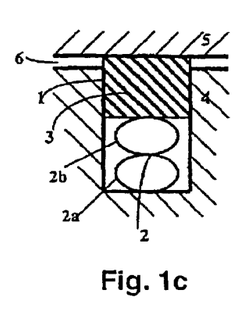

FIG. 1a–c show in diagrammatic representation the structure of a sealing device, disposed in a cylindrical groove 1 situated in the periphery of an end face, on which the devices according to the invention are used. The sealing device comprises a hose element 2, situated in the bottom of the groove 1 and comprising two oval, tubular hoses 2a and 2b and a sealing element 3. FIG. 1a shows the sealing device in the initial position, i.e. in which a sealing function is not configured between a first 4 and a second 5 part which are movable between themselves and which form a gap 6 therebetween. When the hose element 2 is pressurized, the sealing element 3 is pressed in its motional direction against the part 5, as is shown in FIG. 1*b*, and by increasing the pressure in the hose element 2 a successive wearing of the sealing element 3 is compensated, as is shown in FIG. 1*c*, a constant contact force against the part 5 being able to be obtained.

Figure 2:
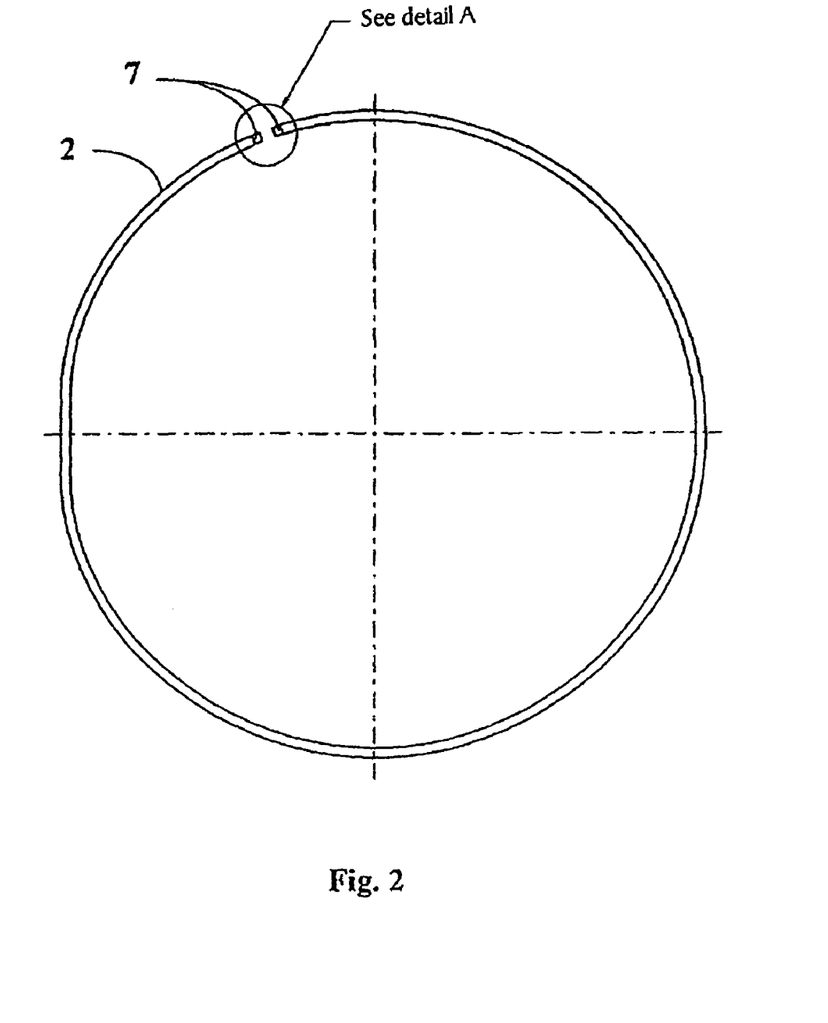
FIG. 2 shows in diagrammatic representation a hose element with sleeves according to the invention.

FIG. 2 shows in diagrammatic representation a hose element 2 with sleeves 7 according to the invention. The circular shape of the hose element 2 here substantially corresponds to the periphery of the rotary drum end faces in a filter press.

Figure 3:
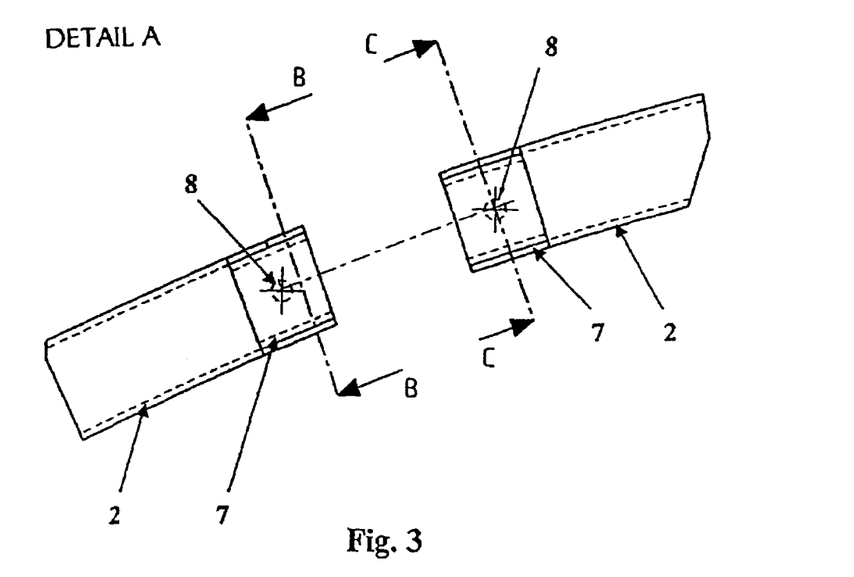
FIG. 3 is a detail of FIG. 2, which shows the hose element and the sleeves according to the invention, FIG. 4a, b show the sleeve according to the invention in the sections B—B and C—C in FIG. 3.

FIG. 3 is detail A from FIG. 2, which shows the hose element 2 and the sleeves 7 according to the invention. FIG. 3 shows the holes or projections 8 in the sleeves 7, which are configured so as to fit against form-locking members 16, 16' (see FIG. 6) in the bottom of the groove 1 in order to hold the hose element 2 in a fixed position in the groove 1. The holes 8 go at least through that side of the sleeve 7 which is intended to lie closest to the bottom of the groove 1 and the nearest hose 2*a* and the sleeve 9 according to FIG. 4*a*.

Figure 4A:
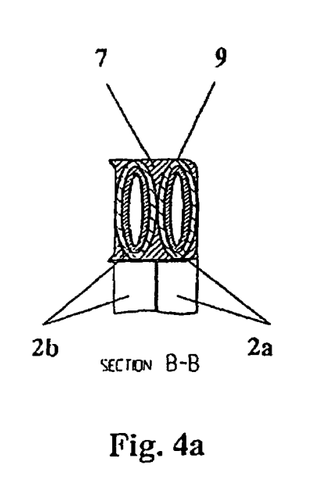
Figure 4B:
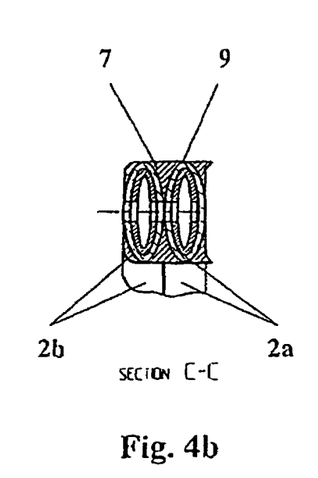

FIGS. 4*a* and 4*b* show the sleeves 7 in FIG. 3 in the sections B—B and C—C. The sleeves 7 enclose the ends of the mutually adjoining oval hoses 2*a*, 2*b* in the hose element 2. The hoses 2*a*, 2*b* are supported internally by rigid sleeves 9 of a length substantially corresponding to the length of the sleeves 7. The sleeves 9 have an oval shape with the minor axis parallel with the motional direction of the sealing element and the major axis orthogonal to this, so that the extent of the sleeve 7 in the vertical direction of the groove 1 is limited. The sleeves help the hose ends to be kept open and hence guarantee a maintained open flow area. The outer cross-sectional measurement of the sleeves 7 is matched to the measurement of the groove 1 in such a way that they closely connect to the bottom and sides of the groove 1 under sealing contact and have a height which at least provides room for a holder element 10 (see FIG. 5) without this sticking up out of the groove 1.

It is important that the hose ends are held in place in the sleeves 7. Depending on chosen material in the sleeve 7 (plastic, polymer, rubber, etc.), this can be achieved by vulcanizing, gluing or grouting the hose ends in the sleeve 7. The sleeves internally supporting the hose ends also have the task of securing the ends in the sleeves 7.

Figure 5:
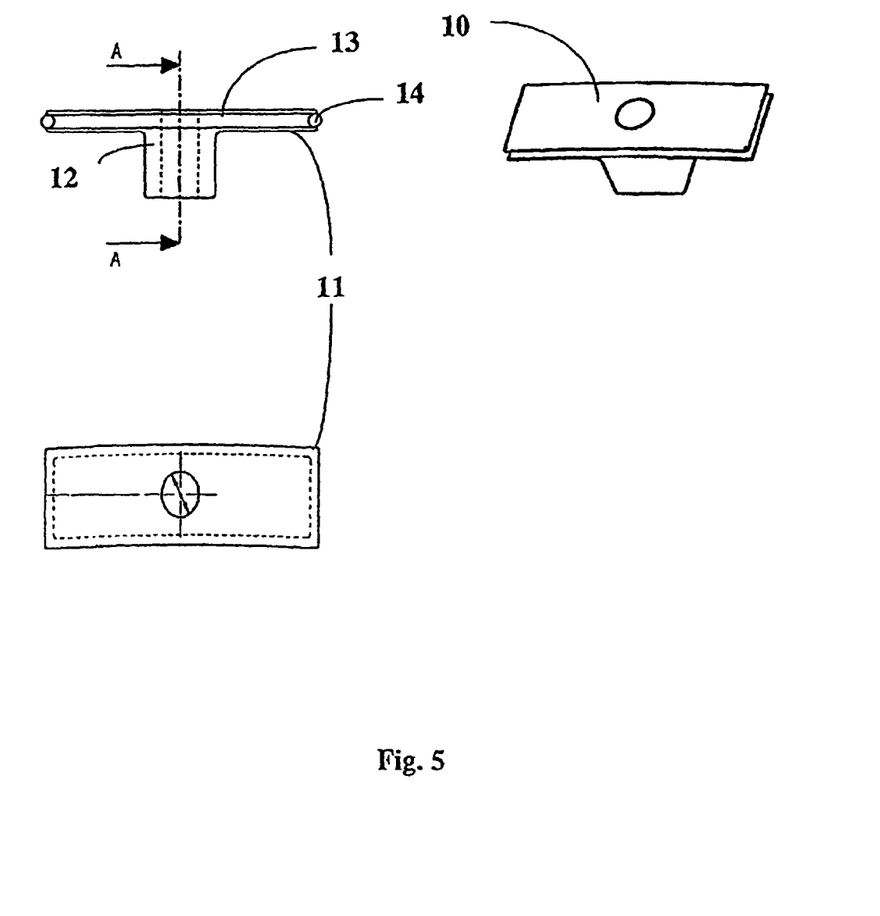
FIG. 5 shows the holder element in two views according to the invention.

The holder element 10 shown in FIG. 5 has the shape of a flatly extended T having a cover 11 and a middle piece 12, in which the middle piece 12 has such a shape that it closely connects to the bottom and the sides of the groove 1 and hence seal off the circular groove 1 when the holder element 10 is mounted in the groove 1. The holder element 10 is held easily in place with a positioning screw 20 passing through the hole 15 in the middle piece 12 (see FIGS. 8*a*, 8*b*), which positioning screw engages in a threaded hole 15' (shown in FIG. 6) in the bottom of the groove 1.

The overlying cover 11 on the holder element 10 runs in the longitudinal direction of the groove 1 and, when mounted, the cover 11 presses the sleeve-furnished ends of the hose element 2 in the groove 1 down into a predetermined position. The overlying cover 11 is provided with a groove 13 for a seal 14 for complete sealing of the two long sides of the cover and hence sealing of the two spaces 19*a*, 19*b* (see FIG. 9) in which inlets 17 and outlets 18 for the pressurizing medium emerge (see FIG. 6).

Figure 6:
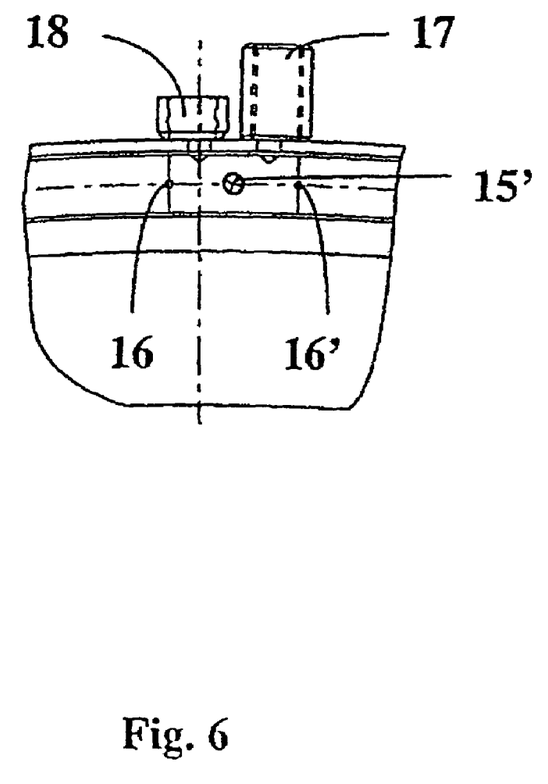
FIG. 6 shows the appearance of the groove and the connecting elements for the supply and evacuation of the pressurizing medium of the hose element.

FIG. 6 shows a part of the groove 1 having a threaded hole 15' for the positioning screw 20 (see FIGS. 8*a*, 8*b*), two form-locking members 16, 16' in the form of journals or recesses in the bottom of the groove 1 and an inlet 17 and an outlet 18 for the pressurizing medium.

Figure 7:
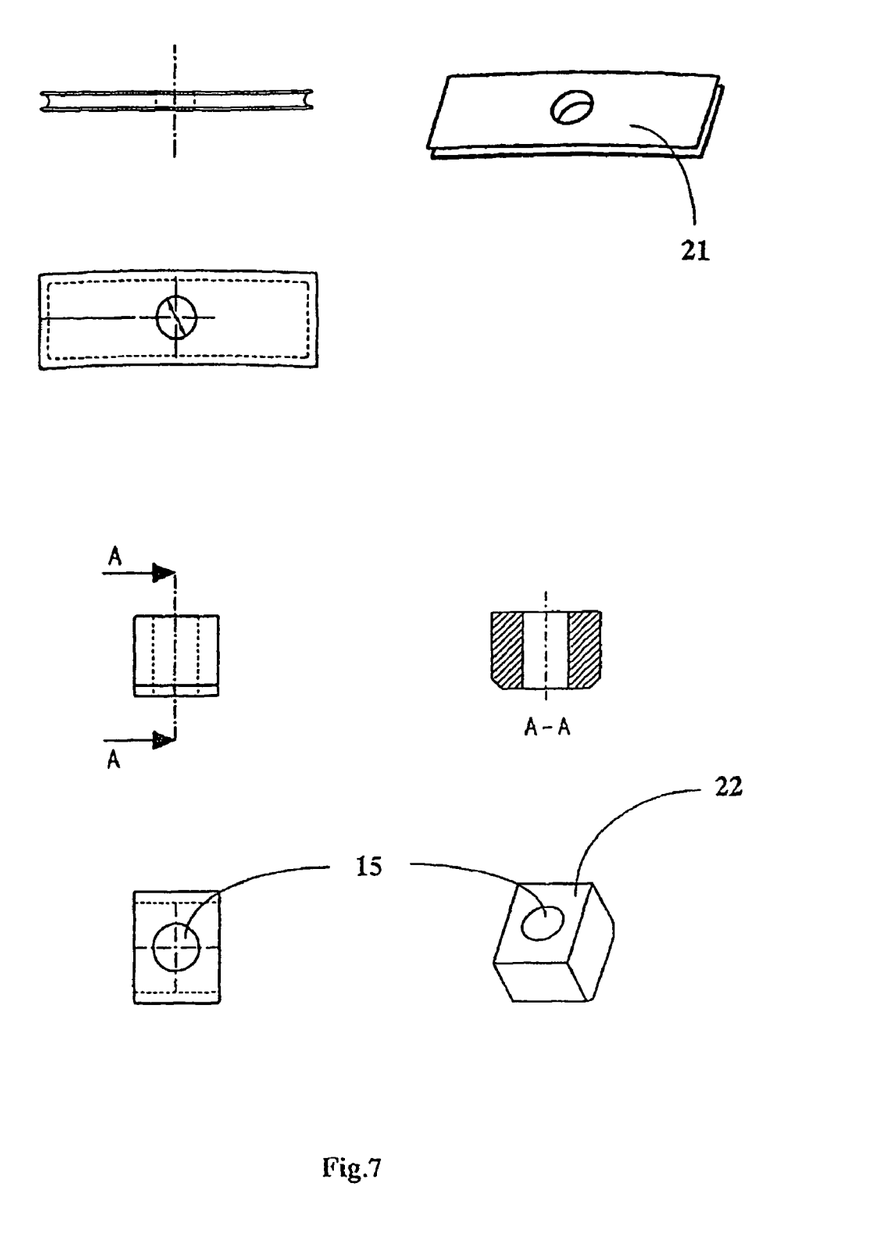
FIG. 7 shows an alternative embodiment of the holder element.

FIG. 7 shows an alternative embodiment of the holder element 10, in which this consists of two parts, a cover 21 and a middle piece 22. The cover 21 is configured in the same way as previously described, with a hole 15 for positional fixing with the positioning screw 20 and a groove 13 for a seal 14 and having an extended shape in the longitudinal direction of the groove 1 so that the cover 21, when mounted in the groove 1, enters into sealing contact in the sides of the groove 1 and so that the cover 11 presses down the sleeves 7 such that these enter into sealing contact against the bottom and sides of the groove 1. The middle piece 22 has the shape of a rectangular pellet with corresponding holes 15 for positional fixing with the positioning screw 20.

A splitting of the holder element into two parts results in a simplified production and hence reduced production costs. A further advantage is that the cover 21 and middle piece 22 can be made in various materials. For example, the cover 21 can be constituted by metal, whilst the middle piece 22 can be made of any polymeric material. Through a suitable choice of material, the middle piece 22 can be given such characteristics that when pressurized, which pressure also acts upon those sides of the middle piece 22 facing the sleeves 7, it undergoes an elastic deformation to form a sealing contact against the adjacent sides of the groove 1. This offers further advantages with respect to the production of the middle piece 22, when the requirement of exact fitting in the groove 1 diminishes and production tolerances can thus be increased.

Figure 8:
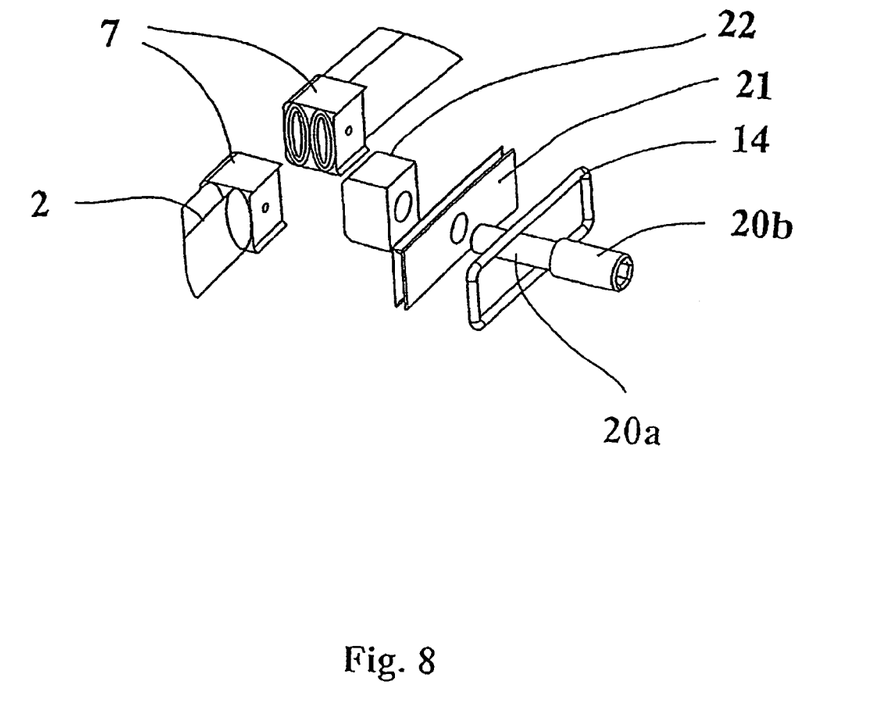
FIG. 8 shows the assembly principle of the sealing device.

FIG. 8*a* shows the principle for assembly of the positioning screw 20, the holder element 10 (seal 14, cover 21, middle piece 22) and the hose element 2 with associated sleeves 7. FIG. 8*b* shows the positioning screw 20 when the holder element 10 is fixed in the groove 1. The lower part 20*a* of the positioning screw has a diameter corresponding to the diameter of the hole 15 in the holder element 10. The upper part 20*b* of the positioning screw has a diameter which is somewhat larger than the hole 15. The holder element is pressed down in the groove 1 by contact against the lug which is formed in the transition between these parts.

Figure 9:
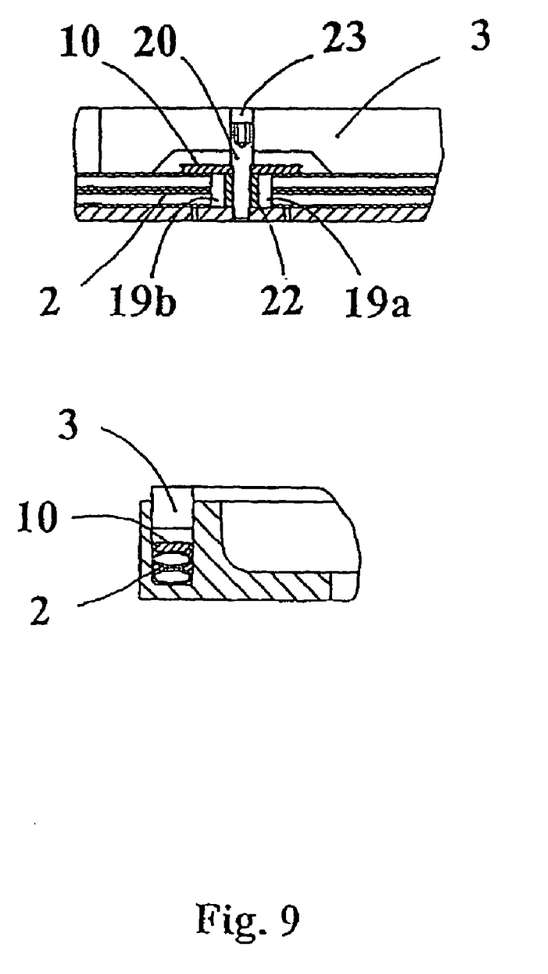
FIG. 9 shows the sealing element mounted in the groove in which the sleeves have been fixed in their position with the holder element.

FIG. 9 shows the sealing device mounted in the groove 1 in which the sleeves 7 are secured in their position with the positioning screw 20 and the holder element 10. The figure shows the two spaces 19*a*, 19*b* which are thereby formed on both sides of the middle piece 22 of the holder element in front of the open hose ends of the two sleeves 7, in which hose ends inlets 17 and outlets 18 of the pressurization medium emerge. The very compact configuration of the sealing device results in the overlying sealing element 3 being able to be allowed to run round the whole of the circular groove 1, including over the holder element 10. An equally large contact force against the majority of the sealing element 3 is thereby obtained. In the section next to the holder element 10, a reduction of the contact force against the sealing element 3 is locally obtained. A rigid material in the sealing element 3 reduces, however, the size of this reduction. It can also be expedient to arrange the sealing device according to the invention such that the section next to holder element 10 is placed where the pressure load upon the sealing element 3 is least.

The positioning screw 20 also has the task of preventing the sealing element 3 from rotating in the groove, which would give rise to obvious problems on those parts of the sealing device situated underneath the groove 1, inter alia wearing of the underlying hose element 2. Rotation of the sealing element 3 is prevented by the positioning screw 20, when it is mounted in the groove 1, having a height such that it reaches up to the upper edge of the groove 1 or directly thereunder and the upper part 20b of the positioning screw, which sticks fully up over the holder element 10, engages with the sealing element 3 via a hole 23 in the latter.

The sealing device according to the invention thus comprises a hose element 2 with sleeves 7 at both ends, in which the sleeves 7 are held in a fixed position by the holes or projections 8 in the sleeves 7 being placed over congruent form-locking members 16, 16' in the bottom of the groove 1. The sleeves 7 are held down in the groove 1, over the form-locking members 16, 16', with the holder element 10, which is fixed with the through-going positioning screw 20 in the threaded hole 15' in the bottom of the groove 1. The distance between the sleeves 7 is adapted so that on both sides of the middle piece 12 of the holder element a space 19a and 19b respectively is formed between the sleeve-furnished open hose ends on the hose element 2 and the holder element 10, in which the limited surfaces are constituted by the bottom and sides of the groove 1, the middle piece 12 of the holder element, the sleeve 7 and the bottom side of the overlying cover 11. In the one space 19a there is an inlet 17 for pressurizing medium and in the other space 19b an outlet 18 for the pressurizing medium. The inlet 17 and the outlet 18 are disposed in holes in the sides of the groove 1. The oval hose openings of the one sleeve 7 are thus provided with pressurized medium and on the other side of the holder element 10 the medium is evacuated through the oval hose mouths of the other sleeve 7. A flow is thereby formed, which ensures the pressurization. By controlling flow and pressure, the sealing device can be adjusted so that adjusted necessary contact force against the sealing element 3 lying on top in the groove 1 is obtained. The pressurizing medium can be air, or a liquid, preferably water.

The invention is not limited to the embodiment described above but can be varied within the scope of the subsequent patent claims.

For example, other ways can be found for fixing the sleeves. The form-locking members can, for example, constitute a part of the cover of the holder element. The cover of the holder element can also be shaped on the bottom side such that fixing of the sleeves is obtained by form-locking of these against the bottom side of the cover. The holes in the sleeves can instead be constituted by projections which fit against congruent recesses in the bottom of the groove.

The sleeves can alternatively or additionally be provided with grooves in the sides which fit against rabbets/wedges in the sides of the groove, which gives, moreover, additional security against insidious leakage of the pressurizing medium. Another variant can be to make the sleeves somewhat wider than the normal groove width and the groove in the section for the sealing device is given corresponding width, which produces a lug behind the sleeve for fixing of the position. The holder element on the sides of the middle piece might be provided with distances against respective sleeves for the creation of the spaces in front of the ends of the hose element where inlet and outlet for pressurizing medium are found.

The invention claimed is:

1. A sealing device for drum filters or filter presses for forming a seal between rotary drum end faces and end faces of a stationary trough in which rotary drums are being situated, the sealing device comprises:

a sealing element (3) disposed in a cylindrical groove (1) situated in a periphery of an end face, in which the sealing element (3) is pressed into sealing contact against an opposite end face by a force exertion member in a form of a hose element (2), which is constituted by at least two flexible hoses (2a, 2b) disposed one on top of the other flexible hose in a bottom of the groove (1) beneath the sealing element (3), the hoses (2a, 2b) being internally pressurizable for a formation of a force exertion, the hose element (2) having two ends in which the two hoses (2a, 2b) disposed one on top of the other are open at their respective ends and the two ends of the hose element being provided with sleeves (7) which enclose the open ends of the hoses (2a, 2b) and the sleeves (7) being held in place in the groove (1) with a T-shaped holder element (10) having a cover (11) and a middle piece (12), spaces (19a, 19b) being formed on both sides of the middle piece (12) of the holder element between the ends of the hose element (2) and the middle piece (12), the space (19a) being provided with an inlet (17) for pressurizing medium and the space (19b) on the other side of the middle piece (12) of the holder element being provided with an outlet (18) for the pressurizing medium.

2. The sealing device according to claim 1 wherein the holder element (10) is locked against the bottom of the groove (1) with a positioning screw (20) passing through the middle piece (12) of the holder element, the holder element (10) locking the sleeves (7) in position in the groove (1) by the use of form-locking members (16, 16') in the bottom of the groove (1).

3. The sealing device according to claim 1, the bottom side of the sealing element (3) has a hole (23) defined therein that is matched against an upper part of a positioning screw (20), the sealing element (3) being locked in its position in a longitudinal direction of the groove (1).

4. The sealing device according to claim 1 wherein the inlet (17) and the outlet (18) for the pressurizing medium are constituted by holes in a side of the groove (1).

5. The sealing device according to claim 1 wherein the sealing device has a sleeve (7) for mounting in a cylindrical groove (1) situated in the periphery of an end face so that the sleeve (7) encloses the mutually adjoining and joined-together ends of the hoses (2a, b) in the hose element (2), at the same time as the ends of the hoses (2a, 2b) are left open.

6. The sealing device according to claim 5 wherein an outer cross-sectional dimension of the sleeve (7) at right angles relative to the hose element (2) is adapted to a dimension of the groove (1) in such a way that they closely connect to the bottom and sides of the groove (1) and in that the sleeve (7) has a height above the bottom of the groove (1) which provides room for a holder element (10) without the holder element sticking up out of the groove (1).

7. The sealing device according to claim 5 wherein the ends of the hoses (2a, b) are provided with internally supporting sleeves (9) of a length substantially corresponding to a length of the sleeve (7) in a longitudinal direction of the groove (1) and have an oval shape.

8. The sealing device according to claim 5 wherein the sleeve (7), on the side facing the bottom of the groove (1), is provided with a projection (8) arranged to fit in a corresponding congruent form-locking member (16, 16') in the bottom of the groove (1) so as to hold the sleeve (7) and the hose element (2) in a predetermined fixed position.

9. The sealing device according to claim 5 wherein the sleeve has an internal support in a hose mouth that has a length substantially corresponding to a length of the sleeve (7) and an oval shape, with a minor axis being parallel to a vertical axis of a sealing element.

10. The sealing device according to claim 5 wherein the sleeve is made of an elastomer.

11. The sealing device according to claim 1 wherein the sealing device has a holder element (10) for fixating two sleeves (7) in a groove (1) and mutually sealing two open ends of the hose element (2) and for forming spaces (19*a*, 19*b*) on both sides of the holder element (10) in front of these sleeves (7) so as to use these spaces (19*a*, 19*b*) and sleeves (7) to distribute a pressurizing medium to the hose element (2), an overlying cover (11) is arranged so that the overlying cover runs in a longitudinal direction of the groove (1), in which an edge of the cover (11) is provided with a circumferential groove (13), having a seal (14), and a middle piece (12) configured such that a shape of the middle piece (12) corresponds to a shape of the bottom and sides of the groove (1) in order to provide a sealing function, and in which the holder element (10), in its middle piece (12), is provided with a through-hole (15) so as to, with a through-passing positioning screw (20), be locked in place against a threaded hole (15') in the bottom of the groove (1).

12. The sealing device according to claim 11 wherein the holder element (10) consists of two parts in a form of a cover (21) and a middle piece (22).

* * * * *